Jan. 16, 1934. T. A. MITCHELL 1,943,336
METHOD OF CHLORIDIZING SULPHIDE ORES
Original Filed April 2, 1931
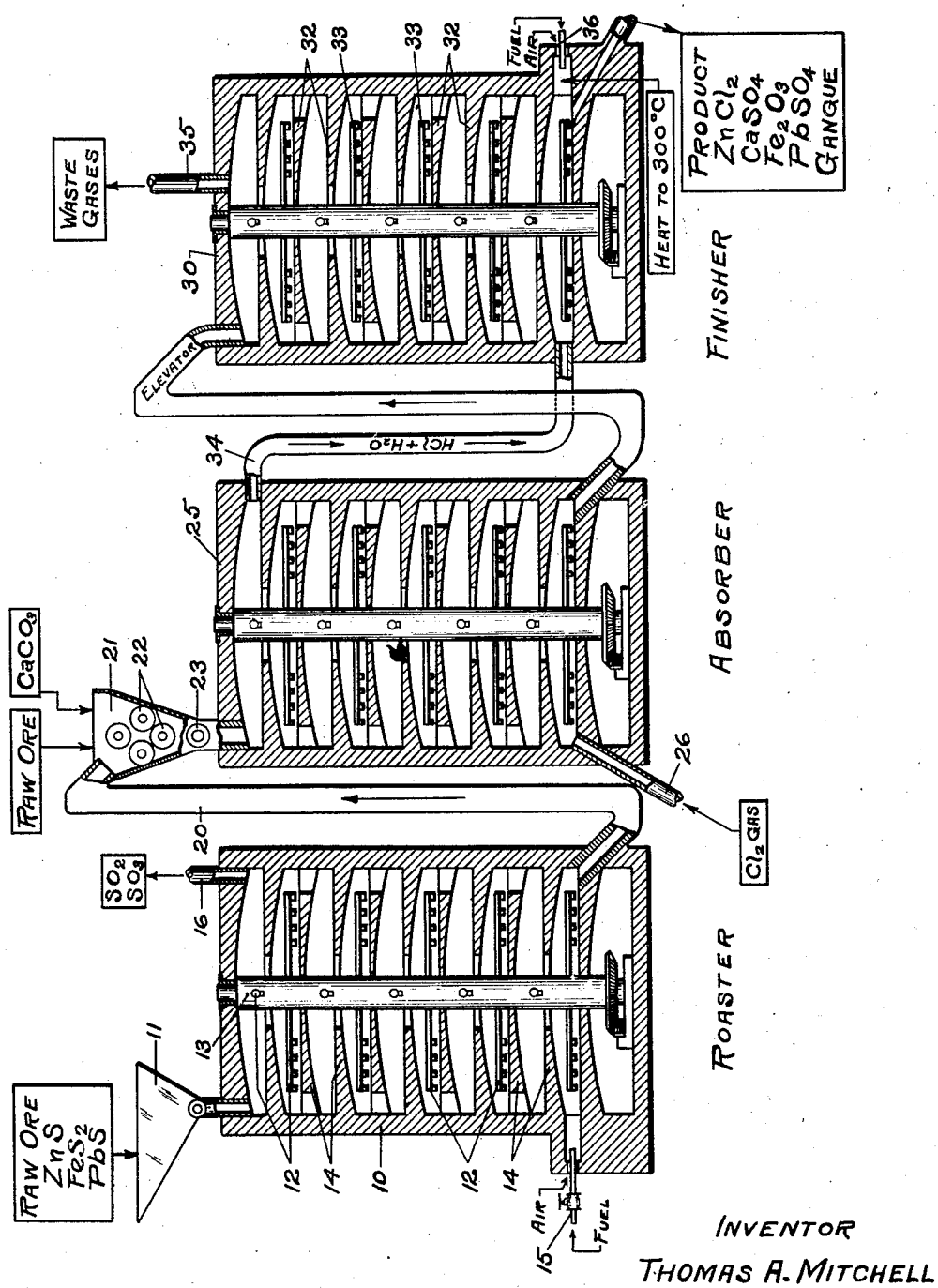
INVENTOR
THOMAS A. MITCHELL
BY Clayton L. Jenks
ATTORNEY Patented Jan. 16, 1934

1,943,336

UNITED STATES PATENT OFFICE 1,943,336

METHOD OF CHLORIDIZING SULPHIDE ORES

Thomas A. Mitchell, Denver, Colo., assignor to Lafayette M. Hughes, Denver, Colo.

Application April 2, 1931, Serial No. 527,253
Renewed October 7, 1933

15 Claims. (Cl. 75—67)

This invention relates to a method of chloridizing a sulphide ore by a direct treatment thereof by means of chlorine.

The methods heretofore employed for chloridizing a complex lead, iron and zinc sulphide ore in the dry condition have been found to be inefficient and expensive. It has been recognized that chlorine is wasted in chloridizing the iron of the ore and various remedies have been proposed, such as heating the ore, either while the chlorine is being introduced or subsequent to that step, to a temperature at which iron chloride is not stable and an oxide is produced. But such schemes have failed economically because of the excessive sulphating of the ore ingredients and a consequent high loss of chlorine. This arises from the fact that when chlorine gas is passed into a dry ore away from air and moisture, metal chlorides and sulphur chloride will be formed; but in actual practice, where both air and moisture are present, oxidation of the sulphur chloride takes place, producing sulphur compounds ranging from free sulphur to sulphuric acid and chlorine compounds, such as hypochlorous and hydrochloric acids. There is sufficient sulphur in ore metal sulphides, if oxidized, to transpose these sulphides entirely to metal sulphates. Since the sulphate radical which has a stronger affinity for the metal can replace the relatively weak chloride ion, sulphuric acid will act on zinc chloride and produce zinc sulphate and liberate hydrochloric acid which is lost with the exit gases. Consequently, the desired ore metals are found as sulphates and not as chlorides and chlorine is wasted.

It is therefore the primary object of this invention to provide a method of treating such sulphide ores which may be carried on efficiently, economically and satisfactorily and which will result in the production of a chloride of a desired ore metal without serious loss of chlorine.

I have discovered that a sulphide ore may be chloridized properly by a series of operations involving a direct treatment with chlorine if the sulphate radical which tends to be formed during the process is converted into or fixed as an insoluble material, such as calcium sulphate, and is prevented from forming water soluble sulphates, such as zinc sulphate. In accordance with my invention, I propose to treat an ore containing a metal sulphide with chlorine gas and at the same time prevent the formation of water soluble sulphates in place of chlorides by fixing the available sulphate radical, produced by the oxidation of the sulphide sulphur to sulphur trioxide, as an insoluble alkaline earth metal sulphate. For this purpose, I propose to carry on the initial chloridizing operation in the presence of an alkaline earth material and preferably the oxide, hydroxide, carbonate or chloride of calcium, strontium or barium, or equivalent materials, which are capable of forming such insoluble sulphates during the operation of chloridizing the sulphide ore.

As a further feature of my invention, I propose to utilize the principles of a well known reaction in accordance with which sulphur, chlorine, steam and air may be combined to form hydrochloric acid and sulphuric acid under correct conditions of temperature. For carrying out such a reaction, I may employ the sulphur in the sulphide ore and thus pass chlorine, air and steam into a sulphide ore to chloridize it. I may also substitute a metal oxide for the hydrogen oxide of this reaction and I preferably use a partially roasted ore for the purpose hereinafter disclosed. This reaction, which results in the formation of both a chloride and a sulphate, is carried out in the presence of an alkaline earth material so that any available sulphate radical or free sulphur trioxide is fixed as an insoluble alkaline earth metal sulphate and so prevented from combining with ore metal oxides which are capable of going either to the sulphate or the chloride form in this type of process.

A simple formula, in accordance with which these reactions take place, may be written as follows:

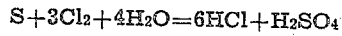
$$S+3Cl_2+4H_2O=6HCl+H_2SO_4$$

When this formula is written, however, to include an ore metal sulphide and oxide in place of the sulphur and water vapor of the above reaction, then the equation may be written as follows, considering zinc sulphide and zinc oxide as the metallurgical ore values present and that calcium carbonate is added for fixing the available sulphate radical:

$$ZnS+3ZnO+CaCO_3+4Cl_2=4ZnCl_2+CaSO_4+CO_2$$

In the above formula, CaO may be substituted for the CaCO$_3$ and thus obviate the formation of carbon dioxide gas. The first equation may be written as follows if there is an excess of oxygen present:

$$S+Cl_2+O_2+2H_2O=2HCl+H_2SO_4$$

Also, water may act, either directly or as a catalyzer, in the process represented by the second equation.

It will now be appreciated, in view of the last equation, that three parts of zinc need to be present as an oxide and one part as a sulphide. Hence in order to satisfy this equation it is desirable to preliminarily roast the sulphide ore in order to produce the three parts of zinc oxide, or if desired an unroasted ore may be mixed with a roasted ore to give the desired proportions.

As an example of various features involved in this invention the following procedure may be adopted, as illustrated diagrammatically in the drawing, for a complex ore analyzing substantially as follows:

| | Per cent by weight |
|---|---|
| Zinc sulphide | 60 |
| Lead sulphide | 30 |
| Iron sulphide | 5 |
| Inert materials | 5 |

This ore is first ground to a standard size as is usually done prior to a roasting operation and is then given an oxidizing roast under conditions which will produce about three parts of zinc oxide to one part of zinc sulphide. This roasting operation may be carried on in accordance with standard practice but preferably at as low a temperature as is feasible so as to avoid the formation of a hard, vitreous mass. A suitable apparatus for roasting this ore may comprise a standard Wedge roasting apparatus 10 to which the material is constantly fed from a hopper 11 and in which it is constantly stirred by a series of revolving rakes 12 suitably driven by the rotating column 13 and which move through the material while it is passed over shelves 14 from the top to the bottom of the apparatus. The heat for the roasting operation, if it is not autogenous, is obtained in any suitable manner, such for example as by means of a gas burner 15 located at the lower end of the apparatus. For such ores as have a high content of sulphide sulphur which is easily burned, it is generally sufficient to allow the ore material to attain that temperature which the combustion of the sulphur will produce and without the aid of external heat. The sulphur oxygen gases escape through duct 16 to suitable recovery apparatus.

The partially roasted ore of the above typical analysis may have approximately the following composition:

| | Per cent by weight |
|---|---|
| Zinc sulphide | 15 |
| Zinc oxide and sulphate | 20 |
| Ferric oxide | 3 |
| Lead sulphate | 38 |
| Inert materials | 5 |

In such a process the lead goes normally to a sulphate while iron comes out as an oxide. As will be observed, no attempt has been made to prevent the formation of zinc sulphate during roasting since at this stage the zinc may be in either the oxide or the sulphate condition. In the next step of my process, which is one of chloridization, it is necessary to prevent the sulphate radical from interfering with the recovery of the zinc as a chloride and the loss of chlorine as sulphur chloride.

In order to fix the available sulphate radical found in the zinc sulphate as well as that derived by further treatments of the ore sulphides during the chloridizing step I next add an alkaline earth metal compound, as above specified, and preferably calcium oxide or calcium carbonate, in an amount calculated to be the molecular equivalent of the available sulphate radical present in the roasted material and the residual sulphide sulphur. For the material of the above specified analysis, it is satisfactory to add about 25% of its weight of finely ground limestone. If calcium oxide is used then the proportions will be changed accordingly. It will be understood that the alkaline earth material may be present in excess of that amount required for fixing the available sulphate radical.

After the lime ore mixture has been produced the material is then chloridized. This chloridizing operation is preferably carried on in two stages, the first stage being that of treating with the chlorine gas and the second stage involving the decomposition of the ferric chloride formed in the first stage. The apparatus for each of these stages may comprise an apparatus of the general type of the Wedge roaster. The first of these two pieces of apparatus will be referred to herein as the "absorber" and the second one as the "finisher". In the process illustrated diagrammatically in the drawing, the partially roasted material, if not carrying the correct 3 to 1 ratio of oxide to sulphide, is mixed with roasted or with raw sulphide ore to get the correct proportions of sulphur and oxide. It is also mixed with the correct amount of calcium oxide, hydroxide, chloride or carbonate, the amount of which has been precalculated to be the molecular equivalent of the available sulphate radical present as we l as that which will be formed during the absorption and finishing stages of the process. This material is ground to a finely divided condition, and preferably one which will pass through a screen of 200 meshes to the linear inch. As shown in the drawing, the partially roasted material coming from the roaster 10 is elevated by suitable means 20 to a mixing apparatus 21 where it is mixed with the lime and raw ore, if required, and then passed through a suitable grinding device, represented diagrammatically by the rolls 22, and thence through a gas valve 23 to the absorber 25 which is substantially the same as the Wedge roaster. Chlorine gas is introduced through pipe 26 into the bottom of the absorption apparatus and passes in counterflow to the ore and lime material which are raked from one shelf to another in descending through the apparatus as is well understood. The ore coming from the roaster is warm but if not hot enough the absorber may be suitably heated by application of external heat, such as by means of heating the chlorine gas or introducing heated air for the purpose. Ordinari'y, I propose to maintain this apparatus only warm enough to evaporate some of the water to keep the zinc chloride from balling up as a sticky mass, but the temperature is kept below 100° C. or the decomposition point of ferric chloride. The ore materials, the alkaline earth metal compound and the gas introduced into the absorber may carry enough moisture for the purposes of this invention but, if desired, water may be introduced so as to serve as a direct reagent or a catalyzer during the process. In general this chloridizing process carried on in the absorber may be considered to comprise the decomposition of ore metal sulphides by chlorine with the resultant formation of sulphur chloride, the decomposition of sulphur chloride with the formation of hydrochloric acid and free sulphur which oxidizes to sulphur dioxide and trioxide, the absorption of the hydrochloric acid by an ore metal oxide provided for the purpose, and the fixation of the sulphur trioxide as an alkaline earth metal sulphate, which thereby prevents the transposition of an ore metal chloride to a sulphate and permits the recovery of that ore metal chloride. The process in the finisher comprises the recovery of chlorine taken up by iron during the initial stages of the chloridization and its being returned to process in a nascent state for use in attacking such difficulty chloridized compounds in the ore material as the sulphides, ferrites and silicates of zinc, all in the presence of a lime content to fix the sulphates produced.

The reactions in this absorber take place generally in accordance with the second equation above written, whereby zinc chloride and calcium sulphate are formed. There of course are intermediate reactions but in general it may be said that the direct attack of the chlorine on the zinc sulphide ore tends to produce sulphur chloride with the subsequent formation of hydrochloric acid together with free sulphur. This hydrochloric acid will be taken up by the zinc oxide introduced for this purpose to form zinc chloride. The sulphur will burn to sulphur dioxide and then to sulphur trioxide in the presence of iron oxide as a catalyzer, but the sulphur trioxide cannot attack the zinc oxide because of the presence of the lime, as well as any lead oxide which may have been formed during roasting, which preferentially take up this sulphate radical to form calcium and lead sulphates. Consequently, this sulphate radical, which would be detrimental to the chloridizing reaction, is fixed as fast as it is formed as an insoluble sulphate. In other words, there is no sulphate radical available to replace the chloride atom in the zinc chloride. The reactions may be considered to take place in stages along the lines represented by the following equations, as well as the equation above written to show the final result:

$$ZnS + Cl_2 = ZnCl_2 + S$$
$$S + Cl_2 = SCl_2$$
$$SCl_2 + 2H_2O + O_2 = 2HCl + H_2SO_4$$
$$S + O_2 = SO_2$$
$$2SO_2 + O_2 = 2SO_3$$
$$2HCl + ZnO = ZnCl_2 + H_2O$$
$$SO_3 + CaCO_3 = CaSO_4 + CO_2$$

During the roasting operation the iron sulphide changes to ferric oxide, and this oxide in the absorption apparatus is converted to iron chloride after the zinc chloride has been produced, it being found that the zinc oxide takes up the chlorine preferentially. Hence the absorption step of the process should be carried on to such a stage that sufficient ferric chloride is developed to satisfy the requirements of the finisher step of the process. It, however, is not necessary that either the roasting or the absorption operation be carried on to any substantial completion since the reactions will be completed in the final finishing stage.

When the zinc oxide has been converted to a chloride and sufficient iron oxide has reacted with the hydrochloric acid to form iron chloride, the next step in the process is to remove and render useful the chlorine tied up with the iron. For this purpose the material is now passed to the finisher 30 of the Wedge roaster type where the chloridizing operation is finished. This device is shown as having the same series of shelves 32 and rakes 33 as in the roaster, but it is to be understood that any suitable roasting and chloridizing apparatus may be used for the purposes of my invention.

The excess of hydrochloric acid gas and such water vapor as is not taken up by the ferric chloride as water of crystallization passes through pipe 34 from the top of the absorber 25 to the bottom of the finisher 30. Such carbon dioxide and water or other gases as reach the top of the finisher apparatus will pass off through pipe 35 into suitable recovery apparatus or they may be allowed to escape into the atmosphere. The lower end of the finisher is heated, as by means of a gas burner 36 to a temperature of approximately 300° C. or at least above the decomposition point of ferric chloride. In case silver is to be recovered, the temperature may go as high as 600° C. at the discharge end of the finisher. An excess of oxygen is provided so that the formation of chlorine and ferric oxide may be accomplished.

The main reaction in the finisher is the decomposition of ferric chloride in the presence of oxygen which proceeds as follows:

$$4FeCl_3 + 3O_2 = 2Fe_2O_3 + 6Cl_2$$

The reaction is essentially one of producing nascent chlorine and of allowing this nascent chlorine to attack the unchloridized portions of the ore and carry on the same general type of reactions as were accomplished in the absorption chamber. The chlorine gas acts in both the absorber and finisher to attack such difficultly chloridized compounds as the silicates and ferrites, but this reaction is particularly efficient in the finisher because of the intimate contact of the nascent chlorine with the ore particles, as well as the higher temperature. In this finisher the ferric chloride will be decomposed gradually as it passes from the upper cool zone to the hotter end of the apparatus. Any water that is present in the material coming from the absorber, and particularly the water derived by melting the crystalline ferric chloride in its own water of crystallization, serves to dissolve the ferric chloride and to cause it to flow around the ore particles, hence the nascent chlorine is formed in very intimate contact with the ore material. Also the ferric chloride in solution may act directly upon the unconverted sulphide and be reduced to ferrous chloride and again regenerated by the chlorine to the -ic condition. In either one of these chambers any zinc sulphate which is formed or present will react with the alkaline earth metal oxide or chloride to form zinc oxide or zinc chloride and alkaline earth metal sulphate, while the zinc oxide set free will react with the hydrochloric acid gas to form zinc chloride. The lead sulphide present in the ore has roasted largely to lead sulphate, but such lead oxide as may be formed will take up free sulphur trioxide formed during the chloridizing stage and be converted to a sulphate, or otherwise to a chloride. Hence the insoluble lead salts will go with the residue as lead sulphate or chloride and thus be separated from the zinc when the material is ultimately leached with a solvent for the zinc chloride.

The final product issuing from the finisher is made up largely of lead sulphate, zinc chloride, ferric oxide, calcium sulphate and various inert materials forming the gangue of the ore. Any water vapor present in the finisher goes off as steam owing to the high temperature there involved. Various procedures may be adopted for separating the materials of the ore, but for the particular ore mentioned in the above example the finely divided material coming from the finisher may be leached with acidulated water or wash water from the zinc chloride treatment which will dissolve zinc chloride and any calcium chloride which may be present, leaving the remainder of the ore materials in the residue from which they may be separated by suitable methods. For example, the lead sulphate may be converted to a chloride by treatment with a hot salt solution and precipitated therefrom by cooling. The zinc chloride may be brought out of solution by treatment with calcium carbonate which precipitates zinc carbonate, leaving calcium chloride in solution and from which it may be suitably recovered for return to process if desired.

It will be appreciated that the finisher step above described may be omitted if desired. If iron oxide is present in the roasted material, the temperature in the absorber may be maintained above the decomposition point of ferric chloride and the chlorine be thus prevented from combining with the iron. It will also be noted that water is present in the absorber thus aiding in the direct formation of hydrochloric acid, and the water is given off by the reaction of the metal oxide with the acid, hence the reactions are carried on in the presence of water, although the materials are in a substantially dry condition, as distinguished from one in which they are immersed or suspended in an aqueous bath.

The process may be varied within the scope of my invention depending upon the nature of the material being treated, as will be understood by those skilled in this art. It is particularly applicable for treating complex ores, as shown by the simple example above given. In this case, lead sulphide is present and is not chloridizable by chlorine, but the zinc is capable of such treatment; hence the process serves to separate the two ingredients by converting the lead to an insoluble sulphate and the zinc to a soluble chloride, while the iron goes also with the residue. The process insures that the ore values are recoverable by simple solution and precipitation methods. The roasting operation is materially cheapened because it need not be carried on at a high temperature or to completion, it serving merely to provide sufficient ore metal oxide for absorbing the available combined chlorine found in the hydrochloric acid. Also, the sulphur oxygen gases given off by the roaster may be easily recovered for the manufacture of sulphuric acid. Since all sulphate radical left in the ore is fixed as an insoluble alkaline earth metal sulphate or lead sulphate, it is not able to replace chlorine combined with the ore metals, hence chlorine or hydrochloric acid is not driven up the chimney and lost. The absorption of chlorine is therefore high and efficient. If the alkaline earth metal compound is not used, then the final product will contain the sulphate of zinc or other ore metals present which are capable of forming both the sulphate and the chloride.

It is to be understood that this case deals primarily with the direct chloridization of a raw sulphide ore by means of chlorine gas, and that any preliminary roasting operation or the addition of an ore metal oxide is for the purpose of providing an ore metal oxide to take up the hydrochloric acid developed by the direct attack of chlorine on the ore metal sulphides. In order to distinguish this case from my other copending applications, the claims are therefore to be interpreted as covering the direct chloridization by chlorine of a raw sulphide ore or an ore mixture which contains a large percentage or quantity of ore metal sulphide which is greatly in excess of that found in a sulphide ore after a standard roasting operation.

Various features of the absorber and finisher treatment are covered broadly by my copending applications Serial No. 597,627 filed March 8, 1932 and Serial No. 687,827 filed September 1, 1933.

Having thus described my invention, what I claim as new and desire to secure by Letters Patent is:

1. The method of chloridizing an ore material containing a large quantity of an unroasted chloridizable ore metal sulphide comprising the steps of passing a current of chlorine gas into contact with the ore material, while the latter is in a substantially dry condition and maintained at a low temperature, and carrying on the reaction in the presence of an alkaline earth metal compound added for the purpose which is capable of and proportioned for fixing the available sulphate radical formed during the process as an insoluble alkaline earth metal sulphate and thereby preventing the transposition of an ore metal chloride to a sulphate.

2. The method of chloridizing an ore containing a large amount of the sulphide of a chloridizable metal comprising the steps of providing a mixture thereof with an alkaline earth material, capable of and proportioned for forming an insoluble alkaline earth metal sulphate with all available sulphate radical formed during the process, treating the mixture with sufficient chlorine gas to react with said ore metal sulphide and carrying on the process at a low temperature and in the presence of water vapor under conditions which cause the formation of a chloride of said ore metal and said alkaline earth metal sulphate.

3. The method of recovering values from a chloridizable sulphide ore comprising the steps of treating the raw substantially dry sulphide ore directly with chlorine gas, water vapor and oxygen under low temperature conditions tending to produce ore metal sulphate and chloride, carrying on the reaction in the presence of an added alkaline earth metal compound capable of and proportioned for fixing the available sulphate radical as insoluble alkaline earth metal sulphate and thereby producing the chloride of a desired ore metal free from its sulphate, and thereafter separating said chloride from the insoluble residue.

4. The method of recovering values from a raw ore containing a chloridizable ore metal sulphide comprising the steps of treating the raw ore with chlorine in the presence of an oxygen compound capable of reacting with the available combined chlorine to form a chloride and with a reagent added for the purpose which is capable of and proportioned for fixing the available sulphate radical as an insoluble metal sulphate and thereby preventing the formation of a sulphate of said ore metal.

5. The method of recovering values from a chloridizable complex sulphide ore comprising the steps of mixing therewith an alkaline earth metal compound capable of and proportioned for fixing the available sulphate radical treating the mixture in a substantially dry condition with chlorine gas, thereby tending to produce an ore metal chloride and sulphur chloride, carrying on the reaction in the presence of water vapor and under oxidizing conditions, thereby tending to produce hydrochloric and sulphuric acids, absorbing all of the hydrochloric acid with a reagent metal oxide proportioned for the purpose and producing a chloride thereof and water vapor, and fixing the sulphate radical as an insoluble alkaline earth metal sulphate, whereby the chlorides of the ore metal and reagent metal are obtained free from the sulphates, said ore metal and reagent metal being the same or different elements.

6. The method of chloridizing a sulphide ore comprising the steps of treating the raw ore in a substantially dry condition with chlorine gas in the presence of water vapor, a chloridizable metal oxygen compound and an added alkaline earth metal compound capable of fixing the available sulphate radical as an insoluble sulphate and carrying on the reactions to cause the formation of a soluble chloride of the ore metal and the sulphate of said alkaline earth metal, and thereafter separating said chloride and sulphate.

7. The method of chloridizing a sulphide ore comprising the steps of treating the ore in a substantially dry condition with chlorine in the presence of an oxygen compound capable of and proportioned for reacting with the available combined chlorine and in the presence of an added alkaline earth metal compound capable of and proportioned for reacting with the available sulphate radical to form an alkaline earth metal sulphate, and thereby preventing the transposition of an ore metal chloride to a sulphate.

8. The method of chloridizing a sulphide ore comprising the steps of treating the raw ore with chlorine in the presence of an ore metal oxide capable of absorbing available hydrochloric acid and in the presence of sufficient alkaline earth metal compound added for the purpose which is of a type capable of and proportioned for reacting with the available sulphate radical to form a sulphate and thereby preventing the transposition of an ore metal chloride to a sulphate.

9. The method of chloridizing a metallurgical ore containing a metal sulphide comprising the steps of treating the ore with chlorine in the presence of a metal oxide capable of reacting with available combined chlorine formed in the process, the metal oxide being present in substantially the proportion of three parts of oxide to one part of the sulphide of said ore metal, and fixing the available sulphate radical as an alkaline earth metal sulphate.

10. The method of chloridizing a sulphide ore comprising the steps of partially roasting the ore to provide an ore metal oxide sufficient in amount to combine with any hydrochloric acid formed during the process, and then treating an ore mixture containing said oxide and the unroasted metal sulphide at a low temperature with chlorine gas in the presence of a sufficient amount of an alkaline earth metal compound added for the purpose which is capable of fixing the available sulphate radical as an alkaline earth metal sulphate and under conditions resulting in the formation of a metal chloride with all of the available chloridion.

11. The method of chloridizing a metallurgical sulphide ore comprising the steps of partially roasting the ore and providing an ore mixture containing substantially one part of an ore metal sulphide capable of being chloridized and three parts of the oxide of said metal, then treating the mixture with chlorine gas in the presence of a sufficient amount of an alkaline earth metal compound capable of fixing any available sulphate radical as alkaline earth metal sulphate.

12. The method of chloridizing an ore mixture containing the oxide of iron and a large quantity of the unroasted sulphide of a chloridizable metal comprising the steps of passing a current of chlorine gas over the mixture at a temperature at which ferric chloride is stable, carrying on the reaction in the presence of water vapor and an alkaline earth metal compound added for the purpose which is capable of and proportioned for reacting with available sulphate radical to form alkaline earth metal sulphate, and thereby forming chlorides of iron and said ore metal, and subsequently heating the mixture in an oxidizing atmosphere to a temperature at which ferric combined chloride is not stable in order to recover the chlorine therein for further use.

13. The method of chloridizing an ore containing the sulphides of iron and a chloridizable metal comprising the steps of partially roasting the ore to form oxides of said metals and providing an ore material containing a large quantity of unroasted ore metal sulphide, then treating the ore material with chlorine gas in the presence of water vapor, oxygen and a sufficient amount of an alkaline earth metal compound added for the purpose which is capable of fixing all available sulphate radical, while maintaining the temperature below the decomposition point of ferric chloride, and thereafter heating the material in an oxidizing atmosphere to a temperature at which ferric chloride is not stable.

14. The method of chloridizing a complex ore containing sulphides of iron and a chloridizable metal comprising the steps of roasting the ore and providing an ore material containing the oxide of iron and the sulphide and oxide of said metal, passing chlorine gas over the substantially dry ore material to chloridize the ore metal sulphide, while maintaining the temperature and the conditions of the reaction such as to insure the formation of some iron chloride, the metal oxides being present in amount sufficient to combine with the available hydrochloric acid, carrying on the reaction in the presence of an alkaline earth metal compound added for the purpose which is capable of and proportioned for fixing all of the available sulphate radical formed by the reaction of chlorine on the metal sulphide, and thereafter heating the ore material in the presence of moisture and under oxidizing conditions to form ferric oxide and recover the combined chlorine in the iron oxide for reuse.

15. The method of separating metal values in a complex ore containing the sulphides of zinc and lead comprising the steps of preliminarily roasting the material under oxidizing conditions, treating the roasted material with chlorine gas in the presence of a sufficient amount of a metal oxide capable of reacting with chloride ion formed during the process and with sufficient material added for the purpose which is capable of fixing the available sulphate radical as an insoluble metal sulphate, thereby producing lead sulphate and zinc chloride, and thereafter dissolving the zinc chloride while causing the lead sulphate to go with the residue.

THOMAS A. MITCHELL.

CERTIFICATE OF CORRECTION.

Patent No. 1,943,336.  January 16, 1934.

THOMAS A. MITCHELL.

It is hereby certified that error appears in the printed specification of the above numbered patent requiring correction as follows: Page 2, line 143, after "or" insert as; page 4, line 25, for "the" first occurrence read that; and line 143, claim 5, after "radical" insert a comma; page 5, line 93, claim 12, strike out the word "combined" and insert the same before "chlorine" in line 94 of same claim; and that the said Letters Patent should be read with these corrections therein that the same may conform to the record of the case in the Patent Office.

Signed and sealed this 2nd day of October, A. D. 1934.

Leslie Frazer (Seal)

Acting Commissioner of Patents.